United States Patent
Fujiwara et al.

(10) Patent No.: US 11,838,574 B2
(45) Date of Patent: Dec. 5, 2023

(54) CONTENT DISTRIBUTION SYSTEM

(71) Applicant: NIPPON TELEGRAPH AND TELEPHONE CORPORATION, Tokyo (JP)

(72) Inventors: Toshihito Fujiwara, Musashino (JP); Tomohiro Taniguchi, Musashino (JP); Hiroya Ono, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/920,505

(22) PCT Filed: Apr. 27, 2020

(86) PCT No.: PCT/JP2020/018025
§ 371 (c)(1),
(2) Date: Oct. 21, 2022

(87) PCT Pub. No.: WO2021/220368
PCT Pub. Date: Nov. 4, 2021

(65) Prior Publication Data
US 2023/0140859 A1 May 11, 2023

(51) Int. Cl.
*H04N 21/266* (2011.01)
*H04N 21/222* (2011.01)
*H04N 21/6405* (2011.01)

(52) U.S. Cl.
CPC ..... *H04N 21/26616* (2013.01); *H04N 21/222* (2013.01); *H04N 21/6405* (2013.01)

(58) Field of Classification Search
CPC .......... H04N 21/26616; H04N 21/222; H04N 21/6405
See application file for complete search history.

(56) References Cited

U.S. PATENT DOCUMENTS 11,032,344 B2 * 6/2021 Bradbury .............. H04L 65/612
2003/0149792 A1 * 8/2003 Goldstein ................ H04L 9/40
709/227
(Continued)

FOREIGN PATENT DOCUMENTS

CN 112368962 A * 2/2021 ......... H04L 25/0204
EP 2658210 A1 * 10/2013 ......... H04L 65/4069
(Continued)

OTHER PUBLICATIONS

William May, Jr., HTTP Live Streaming, Independent Submission Request for Comments: 8216, Aug. 2017.
(Continued)

*Primary Examiner* — James R Sheleheda
(74) *Attorney, Agent, or Firm* — Harness, Dickey & Pierce, P.L.C.

(57) ABSTRACT

An object of the present disclosure is to distribute content with a high quality and low latency without being limited by a low-rate and unstable network and a low-capacity reception-side edge servers while maintaining sufficient traffic reduction effects.

A content distribution system according to the present disclosure converts part of communication for distribution into multicast communication. In the content distribution system, a transmission-side edge server (UC/MC) generates and transmits a plurality of multicast streams having different transfer rates for the same input content, and a reception-side edge server (MC/UC) selects and receives a multicast stream having a desired transfer rate among the plurality of transmitted multicast streams.

6 Claims, 10 Drawing Sheets

(56) References Cited

U.S. PATENT DOCUMENTS

| | | | | |
|---|---|---|---|---|
| 2008/0013563 | A1* | 1/2008 | Sasaki | H04L 12/185 370/442 |
| 2009/0022154 | A1* | 1/2009 | Kiribe | H04L 12/185 370/390 |
| 2009/0141718 | A1* | 6/2009 | Higashida | H04L 69/08 370/390 |
| 2010/0082743 | A1* | 4/2010 | Zeng | H04L 67/02 709/222 |
| 2010/0122305 | A1* | 5/2010 | Moloney | G06Q 30/00 725/54 |
| 2010/0309913 | A1* | 12/2010 | Herodotou | H04L 65/765 370/390 |
| 2011/0107379 | A1* | 5/2011 | Lajoie | H04L 65/612 725/151 |
| 2012/0140645 | A1* | 6/2012 | Bonta | H04L 65/80 370/312 |
| 2017/0339242 | A1* | 11/2017 | Westphal | H04L 65/612 |
| 2018/0343291 | A1* | 11/2018 | Lohmar | H04L 1/0014 |
| 2018/0351868 | A1* | 12/2018 | Cartwright | H04L 47/125 |
| 2019/0260816 | A1* | 8/2019 | Bradbury | H04L 65/612 |
| 2020/0120152 | A1* | 4/2020 | Lindgren | H04L 65/80 |
| 2020/0259600 | A1* | 8/2020 | Cao | H04L 1/0065 |
| 2023/0006719 | A1* | 1/2023 | Ashrafi | H04B 7/0413 |
| 2023/0140859 | A1* | 5/2023 | Fujiwara | H04N 21/222 725/116 |

FOREIGN PATENT DOCUMENTS

| | | | | |
|---|---|---|---|---|
| WO | WO-2010114451 | A1 * | 10/2010 | H04L 65/4084 |
| WO | WO-2016061114 | A1 * | 4/2016 | H04B 10/516 |
| WO | WO-2018210411 | A1 * | 11/2018 | H04L 65/4076 |

OTHER PUBLICATIONS

Information technology—Dynamic adaptive streaming over HTTP (DASH)—Part 1: Media presentation description and segment formats, ISO/IEC23009-1 Third edition, Aug. 2019.

Toshihito Fujiwara and Tomohiro Taniguchi, A Study of Live HTTP Streaming Video Distribution with Multicast Overlay Transmission, IEICE Technical Report, vol. 119, No. 298, 2019.

Toshihito Fujiwara and Tomohiro Taniguchi, Multicast Converted Distribution for Live HTTP Streaming Video, IEICE Technical Report, vol. 119, No. 323, 2019.

Toshihito Fujiwara et al., A Study on the Live HTTP Streaming Video Delivery with Cascaded Multicast Conversion, 2020 General Conference of the Institute of Electronics, Information and Communication Engineers, Mar. 17, 2020, p. 172.

* cited by examiner

[1]

CONTENT DISTRIBUTION SYSTEM

CROSS-REFERENCE TO RELATED APPLICATIONS

This application is a 371 U.S. National Phase of International Application No. PCT/JP2020/018025, filed on Apr. 27, 2020. The entire disclosure of the above application is incorporated herein by reference.

TECHNICAL FIELD

The present disclosure relates to a method for converting traffic of a plurality of unicast streams having the same content identifier for different destinations from unicast into multicast, from multicast into multicast, and from multicast into unicast.

BACKGROUND ART

HTTP streaming methods such as HLS (NPL 1) and MPEG-DASH (NPL 2) are known for video distribution using HTTP. When the same content, such as live content, is distributed simultaneously to a large number of users in HTTP streaming, loads on the server and the network are easily likely to increase because the content is communicated from the server to individual clients in unicast. If overload on the server or network congestion occurs, Quality of Experience (QoE) in viewing deteriorates, causing low video quality, video stopping, and the like. In order to prevent deteriorating QoE, there is a technique of converting part of communication for distribution into multicast communication (NPL 3 and NPL 4).

FIG. 1 illustrates an example of a technique of converting part of the communication for distribution into multicast communication. In this technique, an edge server (UC/MC) 91 and a plurality of edge servers (MC/UC) 92 are disposed between an origin server 93 and pieces of user equipment (UE) 94, and multicast communication is performed between the origin server 93 and the pieces of UE 94. In this manner, the amount of traffic resulting from transmission of the origin server and the edge server (UC/MC) can be reduced to about 1 per the number of pieces of UE, in comparison with unicast distribution, while keeping the past HTTP interface for the interface between the origin server and the UE. As a result, the load imposed on the origin server can be reduced and stable and high-quality live video distribution to the UE can be achieved while using video distribution servers and web-based players in the prior art.

Video distribution based on HTTP contains a function of preparing a video having a plurality of image qualities and selecting an appropriate image quality that is called Adaptive Bit Rate (ABR) according to the band of the network (NPL 1 and NPL 2). Thus, by transmitting a video with a low image quality and a low transfer rate on the network with a narrower band, the receiver can play back the video with no interruption.

CITATION LIST

Non Patent Literature

NPL 1: RFC8216
NPL 2: ISO/IEC23009
NPL 3: Fujiwara et al., IEICE technical report, CQ2019-102, 2019
NPL 4: Fujiwara et al., IEICE technical report, CQ2019-72, 2019

SUMMARY OF THE INVENTION

Technical Problem

In the technique of converting part of the communication for distribution into multicast communication, a limitation on performance caused by the network or the edge server (MC/UC) occurs. Specifically, because it is necessary to match the transmission rate of multicast packets to the network with the lowest rate or the reception capacity of the edge server (MC/US), the overall transmission latency increases due to the network with the lowest rate or the edge server (MC/US) with the lowest reception capacity (FIG. 2).

In addition, in order to prevent the increase in the latency, a high-rate and QoS-manageable network needs to be used as a network for multicast transmission, and high-performance equipment with high reception capacity needs to be used as an edge server (MC/UC).

With respect to the ABR mentioned above, it is difficult to provide a high image quality video to a reception terminal connected to a narrow-band network because the image quality is switched to a low image quality.

An object of the present disclosure is to provide high-quality and low-latency content distribution to a high-rate and highly stable network or a high-capacity reception-side edge server and provide stable content distribution to a low-rate and unstable network or a low-capacity reception-side edge server at the same time, without being restricted by the low-rate and unstable networks or the low-capacity reception-side edge servers, while maintaining sufficient traffic reduction effects brought about by multicast.

Means for Solving the Problem

To achieve the above object, according to the present disclosure, in a content distribution system for converting part of communication for distribution into multicast communication, a transmission-side edge server (UC/MC) generates and transmits a plurality of multicast streams having different transfer rates for the same input content, and a reception-side edge server (MC/UC) selects and receives a multicast stream having a desired transfer rate among the plurality of transmitted multicast streams.

A content distribution system according to the present disclosure is a content distribution system for converting part of communication for distribution into multicast communication. The content distribution system includes a transmission-side edge server that converts unicast communication into multicast communication and performs transmission to a multicast communication network, and a reception-side edge server that converts the multicast communication transmitted on the multicast communication network into unicast communication. The transmission-side edge server generates and transmits a plurality of multicast streams having different transfer rates for the same input content, and the reception-side edge server selects and receives a multicast stream having a desired transfer rate among the plurality of transmitted multicast streams.

A content distribution method according to the present disclosure is a method performed by a content distribution system for converting part of communication for distribution into multicast communication. The content distribution system includes a transmission-side edge server that converts unicast communication into multicast communication and performs transmission to a multicast communication network, and a reception-side edge server that converts the multicast communication transmitted on the multicast communication network to unicast communication. The transmission-side edge server generates and transmits a plurality of multicast streams having different transfer rates for the same input content, and the reception-side edge server selects and receives a multicast stream having a desired transfer rate among the plurality of transmitted multicast streams.

An edge server apparatus according to the present disclosure is included in a content distribution system for converting part of communication for distribution into multicast communication. The edge server apparatus is a transmission-side edge server that converts unicast communication into multicast communication and performs transmission to a multicast communication network, generates a plurality of multicast streams having different transfer rates for the same content received in the unicast communication, and transmits the plurality of generated multicast streams to the multicast communication network.

An edge server apparatus according to the present disclosure is an edge server apparatus included in a content distribution system for converting part of communication for distribution into multicast communication. The edge server apparatus is a reception-side edge server that converts the multicast communication transmitted on a multicast communication network into unicast communication, receives a plurality of multicast streams having different transfer rates from the multicast communication network, and selects and receives a multicast stream having a desired transfer rate among the plurality of received multicast streams.

A program according to the present disclosure is a program that causes the computer to operate each function of the apparatus of the present disclosure, and a program that causes the computer to perform each step of the method of the present disclosure.

Effects of the Invention

The present disclosure can provide high-quality and low-latency content distribution to a high-rate and highly stable network or a high-capacity reception-side edge server and provide stable content distribution to a low-rate and unstable network or a low-capacity reception-side edge server at the same time, without being restricted by the low-rate and unstable networks or low-capacity reception-side edge servers, while maintaining sufficient traffic reduction effects brought about by multicast.

DESCRIPTION OF EMBODIMENTS

Hereinafter, embodiments of the present disclosure will be described in detail with reference to the drawings. Further, the present disclosure is not limited to the embodiments described below. These examples of the embodiments are merely examples, and the present disclosure can be implemented in forms in which various modifications and improvements are added based on knowledge of those skilled in the art. Constituent elements with the same reference signs in the specification and the drawings are assumed to be the same constituent elements.

For the same content before conversion, an edge server (US/MC) generates and transmits multiple multicast streams with different transmission rates, and another edge server (MC/UC) selectively receives receivable multicast streams.

Figure 1:
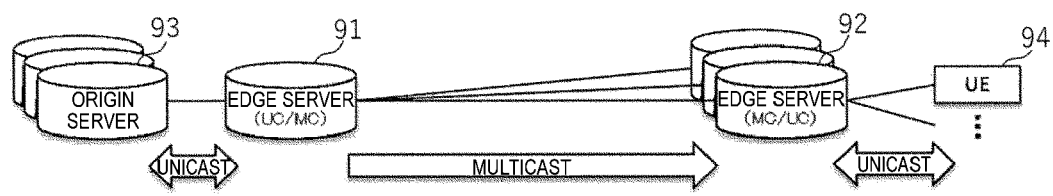
FIG. 1 illustrates an example of a system configuration in which part of the communication for distribution is converted into multicast communication.
Figure 2:
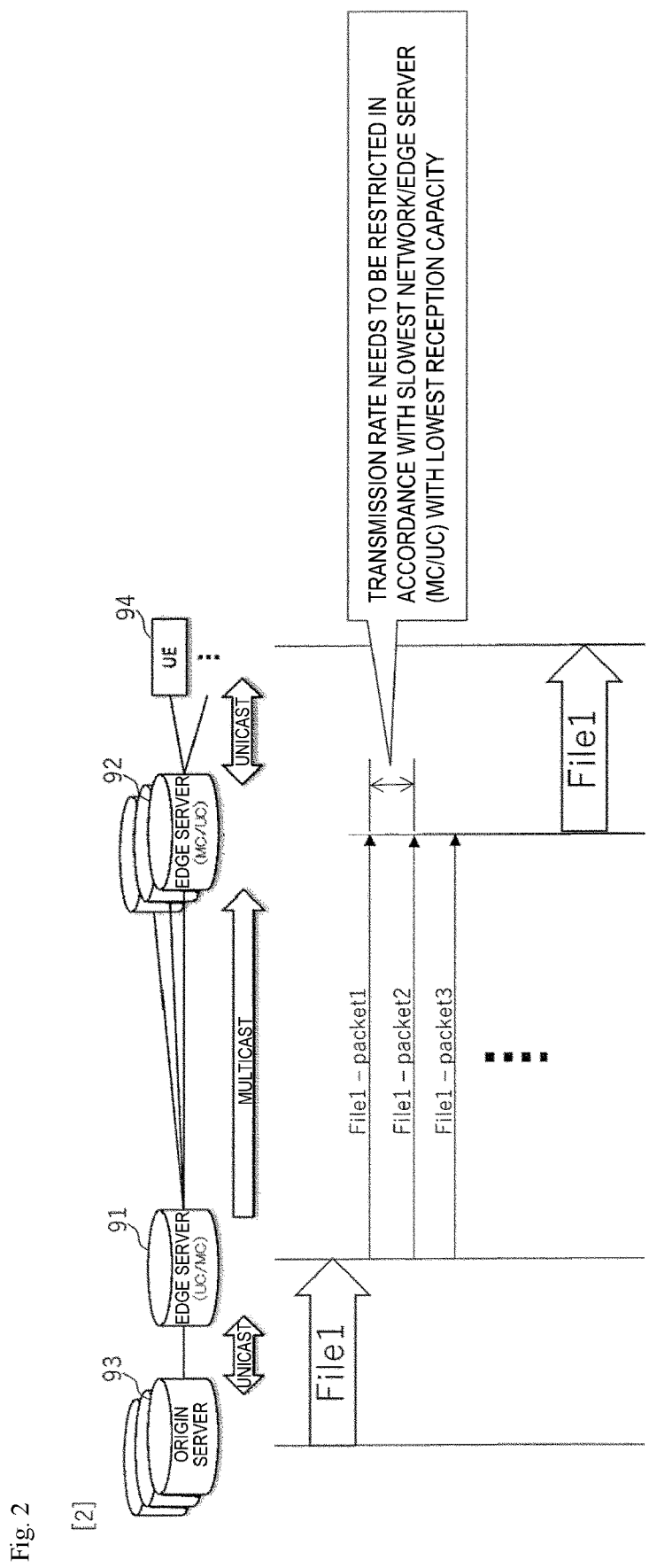
FIG. 2 is a diagram illustrating an issue of the technique of converting part of the communication for distribution into multicast communication.
Figure 3:
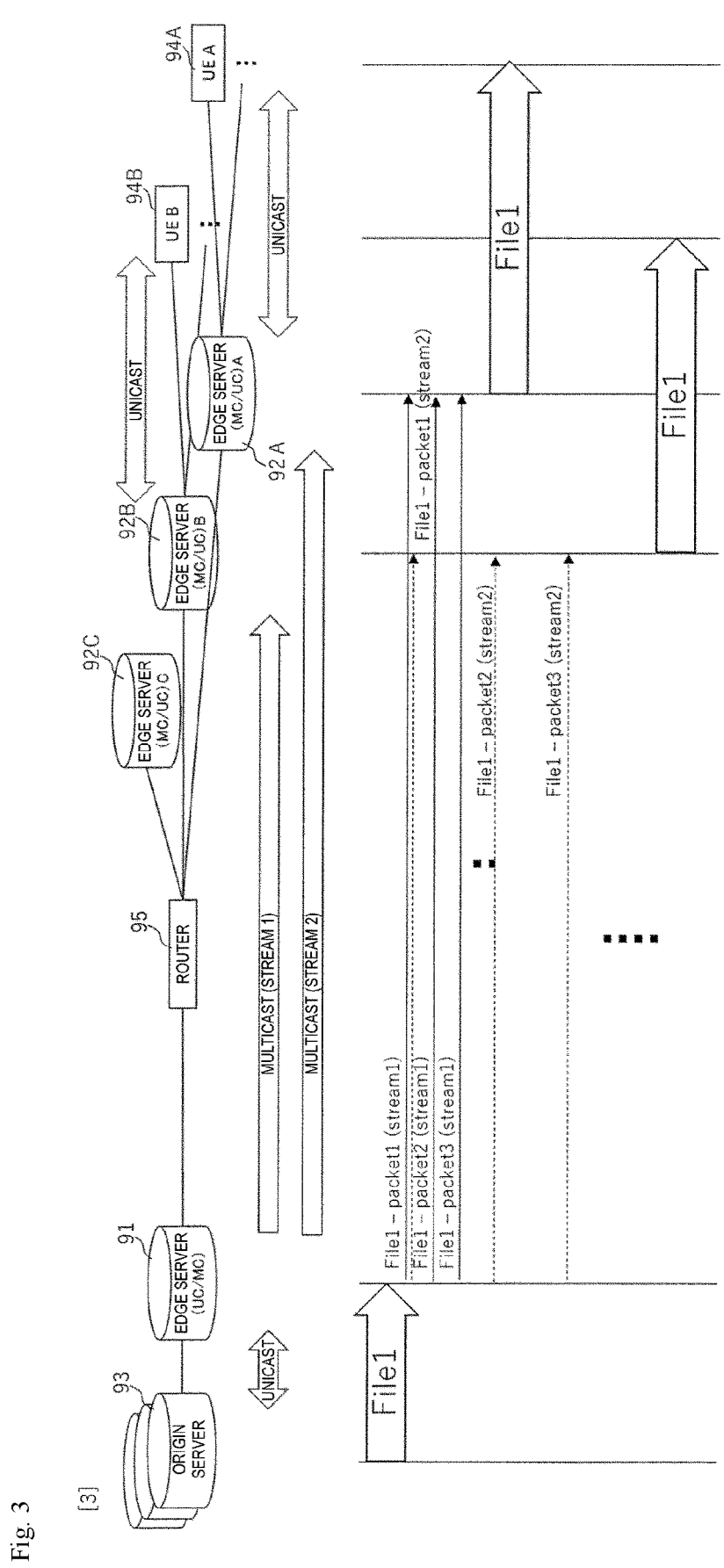
FIG. 3 is an example of a system configuration illustrating an overview of the present disclosure.

FIG. 3 illustrates an overview of the present disclosure. The edge server (UC/MC) 91 generates a stream 1 and a stream 2 for file 1. The stream 1 is subject to high-rate packet transmission, and the stream 2 is subject to low-rate packet transmission. An edge server (MC/UC) 92A is a device for a high-rate or high-performance network for multicast reception and selectively receives the stream 1. Another edge server (MC/UC) 92B is a device for a low-rate or low-performance network for multicast reception and selectively receives the stream 2. Thus, content can be distributed with a low latency according to the reception capacities of the network or the edge servers (MC/UC) 92A, 92B, and 92C.

The multiple multicast streams, such as the stream 1 and stream 2, may be selectively received and transferred via a device such as the edge servers (MC/UC) 92 and a router 95 in the network when part of the headers of the packets, other than data, such as source addresses, group addresses, ports, or priorities are different in the streams in addition to the transmission rates.

The selective multicast reception of streams with different source addresses or group addresses can be controlled by the edge server (MC/UC) 92 using a dynamic multicast route control technique such as an Internet Group Management Protocol (IGMP) or Multicast Listener Discovery (MLD). Thus, only a stream selected by the edge server (MC/UC) 92 is selectively transferred by network equipment, such as the router 95, and thus a stream not selected by the edge server (MC/UC) 92 is not distributed to the corresponding edge server (MC/UC) 92. Also for control of a static multicast route, a pseudo-dynamic multicast route can also perform control in conjunction with an operation system of the network equipment. In a case of a static multicast route, a route for high-rate streams and a route for low-rate streams may be set in advance. The number of streams may be three or more.

As a result, the amount of traffic resulting from transmission of the origin server 93 and the edge server (UC/MC) 91 can be reduced to the number of multicast streams for the content for approximately the number of pieces of UE, compared to unicast distribution. While the amount of traffic increases to approximately a multiple of the number of multicast streams of the content, compared to that in the multicast conversion techniques of the related art (NPL 3 and NPL 4), a sufficient amount of traffic with respect to the server and the network can sufficiently be reduced, considering the fact that the number of pieces of UE is very large.

When there is no UE 94 to connect, the edge server (MC/UC) 92C does not receive stream distribution and thus has no streams to receive, but, when there is the UE 94 to connect, the edge server can receive any stream by performing similar processing to that of any of the edge server 92A or 92B. Further, the number of edge servers (MC/UC) 92 is not limited to three, and may be plural. In the present disclosure, the multiple edge servers (MC/UC) 92A, 92B, and 92C will be denoted as an edge server (MC/UC) 92 if there is no need to distinguish them from each other.

The router 95 that supports multicast is installed on the network between the edge server (UC/MC) 91 and the edge server (MC/UC) 92, and a multicast stream to be distributed to an edge server (MC/UC) 92 may be selected by the router 95. In addition, the selection may also be made in response to a request of an edge server (MC/UC) 92.

Sequence

Sequence Pattern 1: Selection of Edge Server (MC/UC) 92

Figure 4:
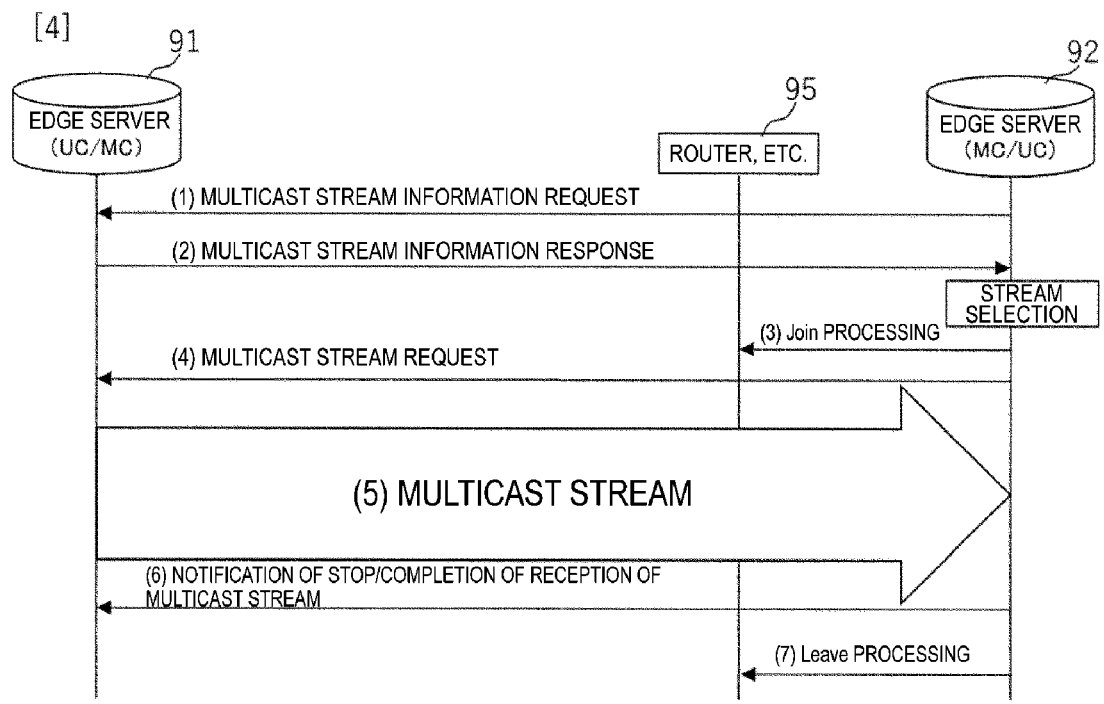
FIG. 4 illustrates a first example of a control sequence for a multicast stream.

FIG. 4 illustrates an example of a control sequence for a multicast stream.

The edge server (MC/UC) 92 requests stream information such as the transmission rate, the source (S) address, the group (G) address, the port, the priority, and the like of content from the edge server (UC/MC) 91 in "(1) multicast stream information request". Here, the request destination of "(1) multicast stream information request" may be a different apparatus from the edge server (UC/MC) 91 that manages the multicast stream information. Further, "(1) multicast stream information request" may be made using a content request from the UE 94 connected to the edge server (MC/UC) 91.

The edge server (UC/MC) 91 responds to the edge server (MC/UC) 92 for a plurality of pieces of stream information to be distributed with "(2) multicast stream information response". Here, the response source of "(2) multicast stream information response" may be a different apparatus from the edge server (UC/MC) 91 that manages the multicast stream information. The edge server (MC/UC) 92 selects a receivable and optimal single stream from the plurality of received pieces of multicast stream information. For example, the edge server (MC/UC) 92 selects a receivable and optimal single stream based on information such as a network connection rate, whether the network connection is by wired or wireless communication, specifications and loads of computation resources such as the CPU and the memory, the past packet reception situations (such as whether an error has occurred), or an upper limit set from the outside or made in a manual manner, and the like.

The edge server (MC/UC) 92 requests distribution of the selected multicast stream as multicast Join from the router 95, or the like disposed on the network that performs transfer in multicast using "(3) Join processing". This allows distribution of the multicast stream selected from the router 95 or the like. For "(3) Join processing", for example, a protocol such as IGMP or MLD can be used.

The edge server (MC/UC) 92 requests distribution of the selected multicast stream from the edge server (UC/MC) 91 using "(4) multicast stream request". Here, the request destination of "(4) multicast stream request" may be a different apparatus from the edge server (UC/MC) 91 that manages the multicast stream information. In this case, the apparatus that manages multicast stream information can request distribution of the multicast stream requested from the edge server (MC/UC) 92 with respect to the edge server (UC/MC) 91 in continuation of "(4) multicast stream request".

Here, the order of "(3) Join processing" and "(4) multicast stream request" may be reversed. In addition, "(3) Join processing" may be omitted in the case of a network on which a static multicast route has been built. Furthermore, "(1) multicast stream information request" and "(2) multicast stream information response" can be omitted if the multicast stream information is known or predetermined.

In addition, "(2) multicast stream information response" may include the fact that distribution has been completed if the corresponding multicast stream has already been distributed due to a request from another edge server (MC/UC) 92. "(4) multicast stream request" may be omitted.

The edge server (UC/MC) 91 distributes the requested stream in "(5) multicast stream", and the edge server (MC/UC) 92 receives the stream. When the corresponding multicast stream has already been distributed due to a request from another edge server (MC/UC) 92, the new distribution can be omitted.

The edge server (MC/UC) 92 can notify the edge server (UC/MC) 91 of stopping or completion of the reception of the multicast stream using "(6) notification of stop/completion of reception of multicast stream". Here, the notification destination of "(6) notification of stop/completion of reception of multicast stream" may be a different apparatus from the edge server (UC/MC) 91 that manages the multicast stream information. In this case, the apparatus that manages the multicast stream information can notify the edge server (UC/MC) 92 of the multicast stream information notified from the edge server (MC/UC) 91 in continuation of "(6) notification of stop/completion of reception of multicast stream". Further, with respect to (6), in a case in which "(4) multicast stream request" times out, or a long time is taken for "(5) multicast stream", continuation of viewing such as a keepalive may be notified from the edge server (MC/UC) 92 in the middle of receiving "(5) multicast stream" and may be used as a substitute for the timeout or in combination. Further, in a case in which distribution of the same multicast stream to other edge servers (MC/UC) 92 continues, the distribution is not stopped, and only in a case in which reception by all edge servers (MC/UC) 92 is stopped/finished, the distribution of the multicast can be stopped.

The edge server (MC/UC) 92 notifies the router 95 on the network that performs transfer in multicast of the fact that the reception of the selected multicast stream has finished in multicast Join, or the like, using "(7) Leave processing". This allows the distribution of the multicast stream selected from the router 95 or the like to be stopped. For "(7) Leave processing", for example, a protocol such as IGMP or MLD can be used.

Here, the order of "(6) notification of stop/completion of reception of multicast stream" and "(7) Leave processing" may be reversed. In addition, "(7) Leave processing" may be omitted in the case of a network on which a static multicast route has been built.

A single stream may be composed of multiple sub-streams. In a case of addresses, for example, a single combination (S1, G1) may be regarded as a single stream 1, and a combination of multiple addresses {(S1, G1), (S2, G2)} may be regarded as a single stream.

Multiple files may be processed as the same multicast stream. For example, there is a case in which one piece of content is stored as divided multiple files in the origin. In this case, they can be regarded as the same multicast stream in terms of the common URL, or the like.

Sequence Pattern 2: Selection of Edge Server (UC/MC) 91

Figure 5:
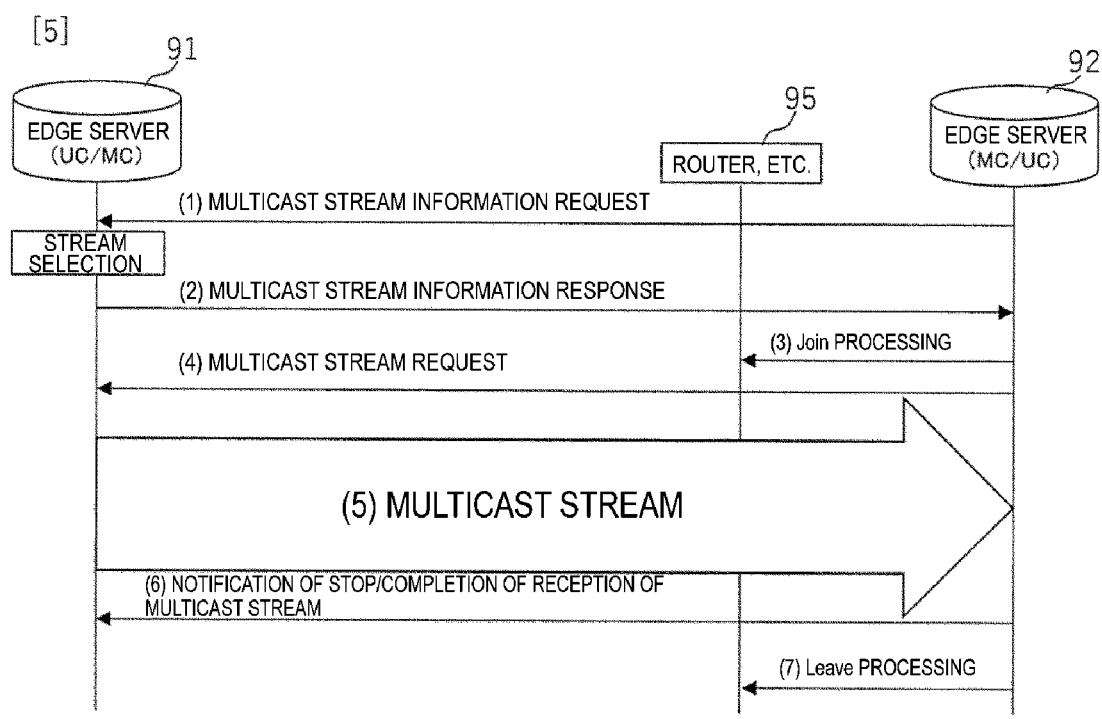
FIG. 5 illustrates a second example of a control sequence for a multicast stream.

FIG. 5 illustrates an example of a control sequence for a multicast stream.

The edge server (MC/UC) 92 requests stream information such as the transmission rate, the source (S) address, the group (G) address, the port, the priority, and the like of content from the edge server (UC/MC) 91 using "(1) multicast stream information request" with the speed information of the stream that the edge server (MC/UC) can receive Here, the request destination of "(1) multicast stream information request" may be a different apparatus from the edge server (UC/MC) 91 that manages the multicast stream information. Further, "(1) multicast stream information request" may be made using a content request from the UE 94 connected to the edge server (MC/UC) 91.

The edge server (UC/MC) 91 selects an optimal single stream from a plurality of pieces of stream information to be distributed based on the information of the rate of the stream that can be received by the edge server (MC/UC) 92 using "(2) multicast stream information response" and responds with only the information of the selected stream. Here, the response source of "(2) multicast stream information response" may be a different apparatus from the edge server (UC/MC) 91 that manages the multicast stream information.

The edge server (MC/UC) 92 requests distribution of the multicast stream according to "(2) multicast stream information response" from the router 95 or the like on the network that performs transfer in multicast in multicast Join, or the like using "(3) Join processing". This allows distribution of the multicast stream selected from the router 95 or the like. For "(3) Join processing", for example, a protocol such as IGMP or MLD can be used.

The edge server (MC/UC) 92 requests distribution of the multicast stream according to "(2) multicast stream information response" from the edge server (UC/MC) 91 using "(4) multicast stream request". Here, the request destination of "(4) multicast stream request" may be a different apparatus from the edge server (UC/MC) that manages the multicast stream information. In this case, the apparatus that manages multicast stream information can request distribution of the multicast stream requested from the edge server (MC/UC) 92 with respect to the edge server (UC/MC) 91 in continuation of "(4) multicast stream request".

Here, the order of "(3) Join processing" and "(4) multicast stream request" may be reversed. In addition, "(3) Join processing" may be omitted in the case of a network on which a static multicast route has been built. Furthermore, "(1) multicast stream information request" and "(2) multicast stream information response" can be omitted if the multicast stream information is known or predetermined.

In addition, "(2) multicast stream information response" may include the fact that distribution is completed if the corresponding multicast stream has already been distributed due to a request from another edge server (MC/UC) 92. Furthermore, "(4) multicast stream request" may be omitted.

The edge server (UC/MC) 91 distributes the requested stream in "(5) multicast stream", and the edge server (MC/UC) 92 receives the stream. Further, when the corresponding multicast stream has already been distributed due to a request from another edge server (MC/UC) 92, the new distribution can be omitted.

The edge server (MC/UC) 92 can notify the edge server (UC/MC) 91 of stopping or completion of the reception of the multicast stream using "(6) notification of stop/completion of reception of multicast stream". Here, the notification destination of "(6) notification of stop/completion of reception of multicast stream" may be a different apparatus from the edge server (UC/MC) 91 that manages the multicast stream information. In this case, the apparatus that manages the multicast stream information can notify the edge server (MC/UC) 92 of the multicast stream information notified from the edge server (UC/MC) 91 in continuation of "(6) notification of stop/completion of reception of multicast stream". Further, with respect to (6), in a case in which "(4) multicast stream request" times out, a long time is being taken for "(5) multicast stream", or the like, continuation of viewing such as a keepalive may be notified from the edge server (MC/UC) 92 in the middle of receiving "(5) multicast stream" and this may replace or be used in combination according to the time-out. Further, in a case in which distribution of the same multicast stream to other edge servers (MC/UC) 92 continues, the distribution is not stopped, and only in a case in which reception by all edge servers (MC/UC) 92 is stopped/finished, can the distribution of the multicast be stopped.

The edge server (MC/UC) 92 notifies the router 95 on the network that performs transfer in multicast of the fact that the reception of the selected multicast stream has finished in multicast Join, or the like, using "(7) Leave processing". This allows the distribution of the multicast stream selected from the router 95 or the like to be stopped. For "(7) Leave processing", for example, a protocol such as IGMP or MLD can be used.

Here, the order of "(6) notification of stop/completion of reception of multicast stream" and "(7) Leave processing" may be reversed. In addition, "(7) Leave processing" may be omitted in the case of a network on which a static multicast route has been built.

A single stream may be composed of multiple substreams. In a case of addresses, for example, a single combination (S1, G1) may be considered a single stream 1, and a combination of multiple addresses {(S1, G1), (S2, G2)} may be considered a single stream.

Multiple files may be processed as the same multicast stream. For example, there is a case in which one piece of content is stored as divided multiple files in the origin, or the like. In this case, they can be regarded as the same multicast stream in terms of the common URL, or the like.

Sequence Pattern 3

The sequence pattern 1 and the sequence pattern 2 may be used in combination. In this case, in selection according to the sequence pattern 2, a plurality of streams may be selected and notified, rather than selecting a single stream.

Multicast Stream Information Response

Selection Response 1 of Multicast Stream Information Response

The above-described multicast stream information included in "(2) multicast stream information response" of the edge server (UC/MC) 91 may be selectively included in the response based on other information such as a load on the edge server (UC/MC) 91, a network load imposed from a network operation system, or the like, packet reception error information obtained from the edge server (MC/UC) 92 with respect to previously transmitted packets, and the like, regardless of the content of "(1) multicast stream information request". For example, in a case in which high-rate stream 1 is determined to be unsuitable for transmission based on the information when three streams of high-rate stream 1, mid-rate stream 2, and low-rate Stream 3 are provided, only mid-rate stream 2 and low-rate stream 3 can be transmitted. Such a selective response is used when it is considered that transmission of a high-rate stream is likely to cause a load, such as congestion, on the network or when it is difficult for the edge server (MC/UC) 92 to receive the stream. Therefore, transmission and/or reception with these adverse effects eliminated can be performed.

Selection Response 2 of Multicast Stream Information Response

The above-described multicast stream information included in "(2) multicast stream information response" of the edge server (UC/MC) 91 may be dynamically changed and then included in the response based on other information such as a load on the edge server (UC/MC) 91, a network load imposed from a network operation system, or the like, packet reception error information obtained from the edge server (MC/UC) 92 with respect to previously transmitted packets, and the like, regardless of the content of "(1) multicast stream information request". For example, in a case in which the transmission rate of the current stream is determined to be unsuitable based on the information when three streams of high-rate stream 1, mid-rate stream 2, and low-rate stream 3 are provided, rates may be newly set again to change them as high-rate stream 1', mid-rate Stream 2', and low-rate Stream 3'. The above-described case includes a change to a lower rate and a change to a higher rate. In addition, a new stream with another rate may also be added.

Such a dynamically changed response to the information of the stream changed to have a lower transmission rate is used when it is considered that transmission of a high-rate stream is likely to cause a load, such as congestion, on the network, or when it is difficult for the edge server (MC/UC) 92 to receive the stream. Therefore, transfer with these adverse effects eliminated can be performed.

Such a dynamically changed response to the information of the stream changed to have a higher transmission rate or additional information of a stream with a new rate is used when it is considered that a higher-rate stream can be transmitted on the network or when it is considered that the edge server (MC/UC) 92 can receive the stream. Therefore, transfer with a lower latency can be performed.

Expansion Method

The multicast stream may be a multi-layer multicast stream. One stream of the multi-layer multicast stream will be referred to as a layer here.

Specifically, the edge server (UC/MC) 91 on the transmission side divides the input content and transmits each of the divided streams at the highest transfer rate of different transfer rates. The edge servers (MC/UC) 92A, 92B, and 92C on the reception side receive each of the streams at a desired transfer rate. The edge servers (MC/UC) 92A, 92B, and 92C have different reception rates, which results in a stream that cannot be received by any of the edge servers (MC/UC) 92A, 92B, and 92C. For example, the edge servers (MC/UC) 92B and 92C among the edge servers (MC/UC) 92A, 92B, and 92C may not be able to receive a stream. For this reason, the edge server (UC/MC) 91 on the transmission side sequentially re-transmits some streams, which cannot be received by the edge servers (MC/UC) 92B and 92C at their highest transfer rate, at a transfer rate at which the edge servers (MC/UC) 92B and 92C on the reception side can receive.

Figure 6:
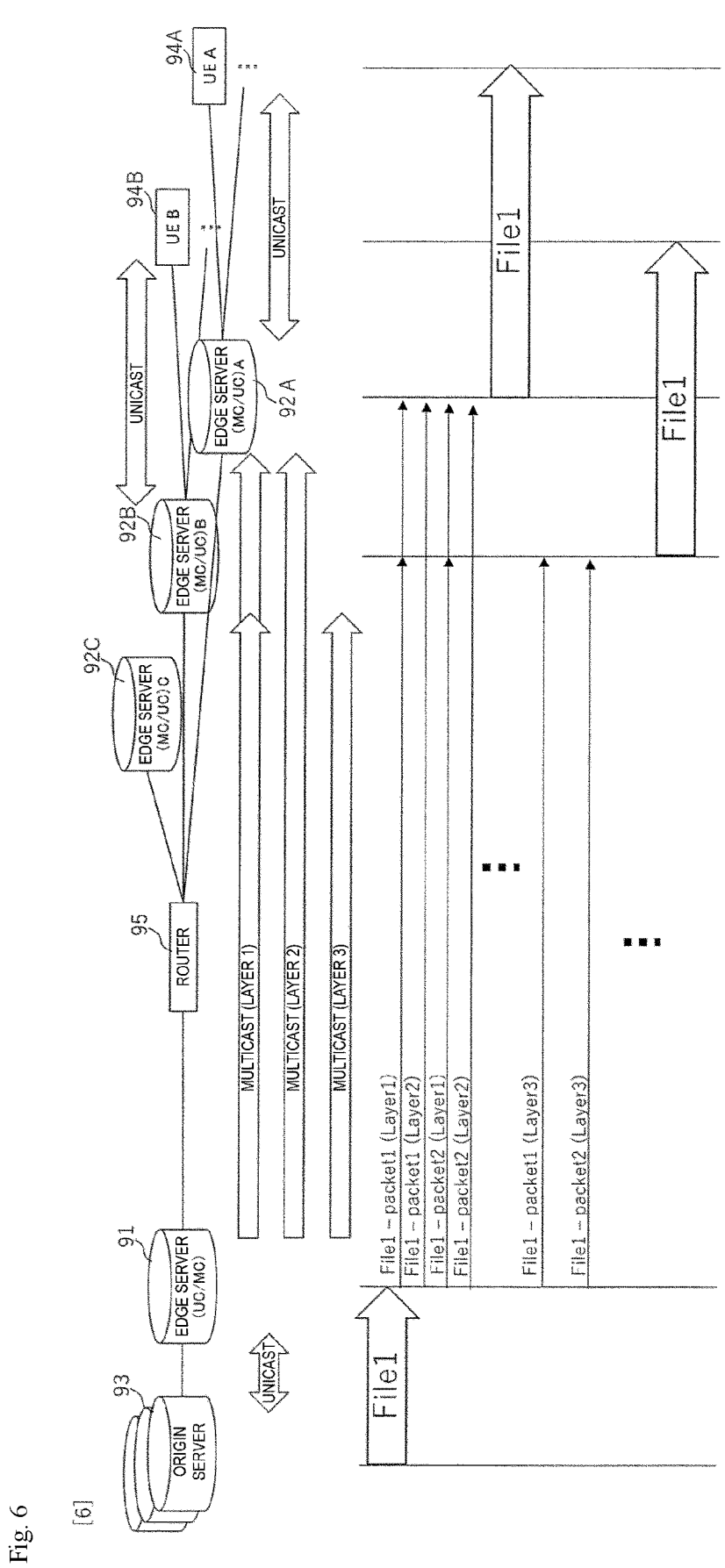
FIG. 6 is an example of a system configuration of a case of transmitting a multi-layer multicast stream.

FIG. 6 illustrates an overview of an example of a group of two reception rates. The edge server (UC/MC) 91 generates layer 1, layer 2, and layer 3 for file 1. At this time, the file 1 can be restored by completing the reception of the layer 1 and the layer 2, or the reception of the layer 1 and the layer 3. Here, the layer 1 and the layer 2 are set as a layer group A, and the layer 1 and the layer 3 are set as a layer group B.

Further, packets of the layer 1 and the layer 2 are transmitted in an alternating manner, and the layer 3 is transmitted after the transmission of the layer 1 is completed. For example, if the layer 1, the layer 2, and the layer 3 have equal data size and packet size, and have the same transmission rate, the layer group A of the file 1 can have a double transfer rate and a half of the transfer latency, compared to the layer group B. Further, the alternating manner mentioned here is not necessarily an alternating manner for every packet, and can be an alternating manner for N packets of the layer 1 and M packets of the layer 2.

The edge server (MC/UC) 92A is equipment with a high-rate or high-performance network for reception in the multicast communication that selectively receives the layer group A, and the edge server (MC/UC) 92B is equipment with a low-rate or low-performance network for reception in the multicast communication that selectively receives the layer group B. In other words, this is a mechanism in which some data is shared as layers by reception groups with different reception rates. This allows content to be distributed with a lower latency in accordance with the reception capacity of the network or the edge servers (MC/UC) 92. In addition, the amount of data to be transmitted can be reduced in accordance with the reception capacity of the network or the edge servers (MC/UC) 92, compared to a case in which streams are transmitted separately.

Each layer such as the layer 1, the layer 2, and the layer 3 are selectively received and transferred by equipment at which the layer is routed such as the edge servers (MC/UC) 92 or the router 95 on the network because the layers have a difference in part of the headers of packets other than data such as the source address, the group address, the port, or the priority as well as the transmission rate.

Selective multicast reception of the layers with different source addresses or group addresses may be controlled by the edge servers (MC/UC) 92 using a dynamic multicast route control technique such as IGMP, MLD, or the like. Thus, only a stream selected by the edge server (MC/UC) 92 is selectively transferred by network equipment, such as the router 95, and thus a layer not selected by the edge server (MC/UC) 92 is not distributed to the corresponding edge server (MC/UC) 92. Even for the control of a static multicast route, control of the pseudo-dynamic multicast route can also be performed in conjunction with an operation system of the network equipment. In addition, in a case of a static multicast route, a route for a high-rate group and a route for a low-rate group may be set in advance. Furthermore, the number of groups may be three or more.

As a result, the amount of traffic resulting from transmission of the origin server 93 and the edge server (UC/MC) 91 can be reduced to the number of multicast streams for content for approximately the number of pieces of UE, compared to unicast distribution. While the amount of traffic increases to approximately a multiple of the number of multicast streams for the content, compared to that in the multicast conversion techniques of the related art (NPL 3 and NPL 4), a sufficient amount of traffic with respect to the server and the network can sufficiently be reduced, considering the fact that the number of pieces of UE is very large.

Moreover, the amount of traffic can be reduced and more stabled and high image quality videos can be distributed by sharing the layers, compared to a method in which layers are not shared.

When there is no UE 94 to connect, the edge server (MC/UC) 92C does not receive stream distribution and thus receives no stream, however, when there is the UE 94 to connect, the edge server can receive any stream by performing similar processing to that of any of the edge server 92A or 92B. Further, the number of edge servers (MC/UC) 92 is not limited to three, and may be multiple.

This method is not based on the premise of hierarchy/scalability by codecs and is not dependent on details of content (files), but can realize scalability of a transfer rate.

Layer

Figure 7:
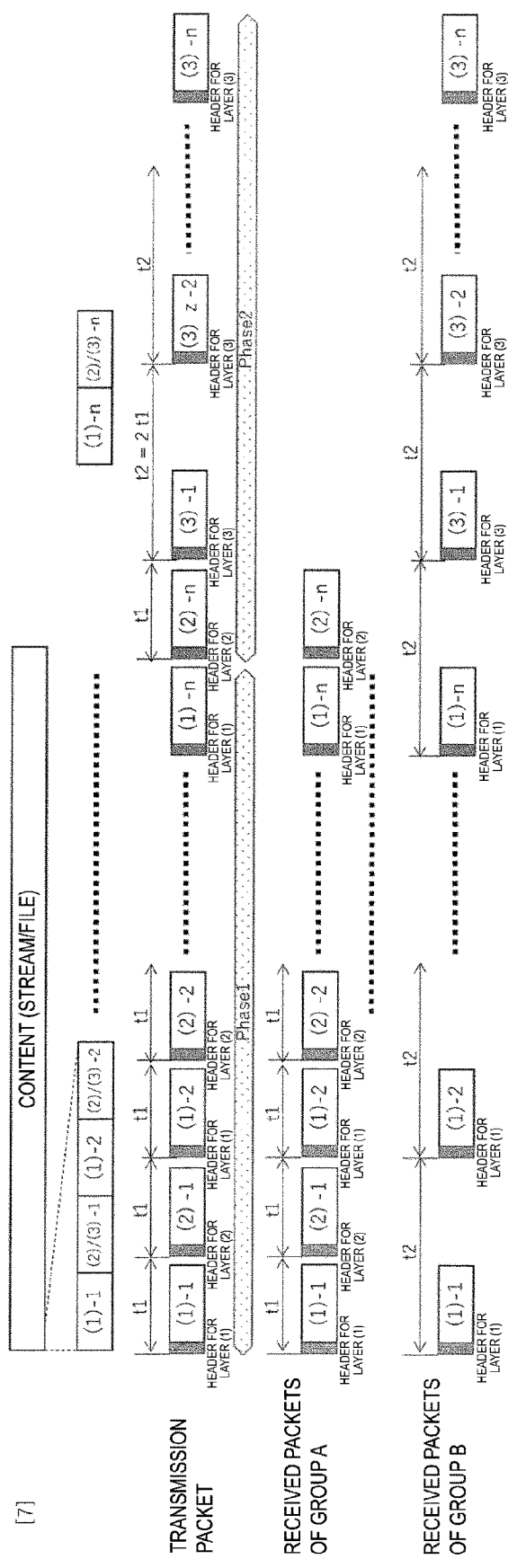
FIG. 7 illustrates an example in which content (file/stream) has been divided.

In the present embodiment, content (a file/a stream) is divided into m layers and received in o groups. The example of FIG. 7 illustrates a case in which content is divided into three layers and received in two groups. Here, (1)-i indicates i-th data of layer 1, (2)-j indicates j-th data of layer 2, and (3)-k indicates k-th data of layer 3.

The content (file/stream) is divided into data having a size that can be transferred as packets from (1)-1, (2)-1, and (3)-1 to (1)-n, (2)-n, and (3)-n. Here, the data of the layer 2 and the data of the layer 3 are the same data. Further, when the content size is not a multiple of 2n, the number of packets allocated to each layer may be different. Each layer has different headers such as a source address, group address, port, and priority to distinguish reception.

In the data transmission, the data of the layer 1 and the data of the layer 2 are alternately transmitted at intervals of t1 in phase 1, and in phase 2 after the transmission of the layers 1 and 2 is completed, the data of the layer 3 is transmitted at intervals of t2 that is equal to 2×t1.

Terminals of a group A receive packets of (1)-1 and (2)-1 to (1)-n and (2)-n of the layers 1 and 2 at the intervals of t1, in other words, the terminals complete reception of the content for the time of 2n×t1 in the phase 1.

Terminals of a group B receive packets of (1)-1 and (3)-1 to (1)-n and (3)-n of the layers 1 and 3 at the intervals of t2, in other words, the terminals complete reception of the content for the time of 2n×t2 (=4n×t1) in the phase 2.

In this case, a reception rate Sa of the group A and the reception rate Sb of the group B satisfy the relationship of Sa/Sb=(2n×t2)/(2n×t1)=t2/t1=(2×t1)/t1=2. Thus, although the data is transmitted to the two groups at different rates, the amount of transmitted data increases just by 1.5 times compared to the case in which data is transmitted to a single group.

Further, the order of transmission of the packets in each phase can be changed. In addition, the location and order of allocation of the layers can be changed within the content.

Layer Pattern

Figure 8:
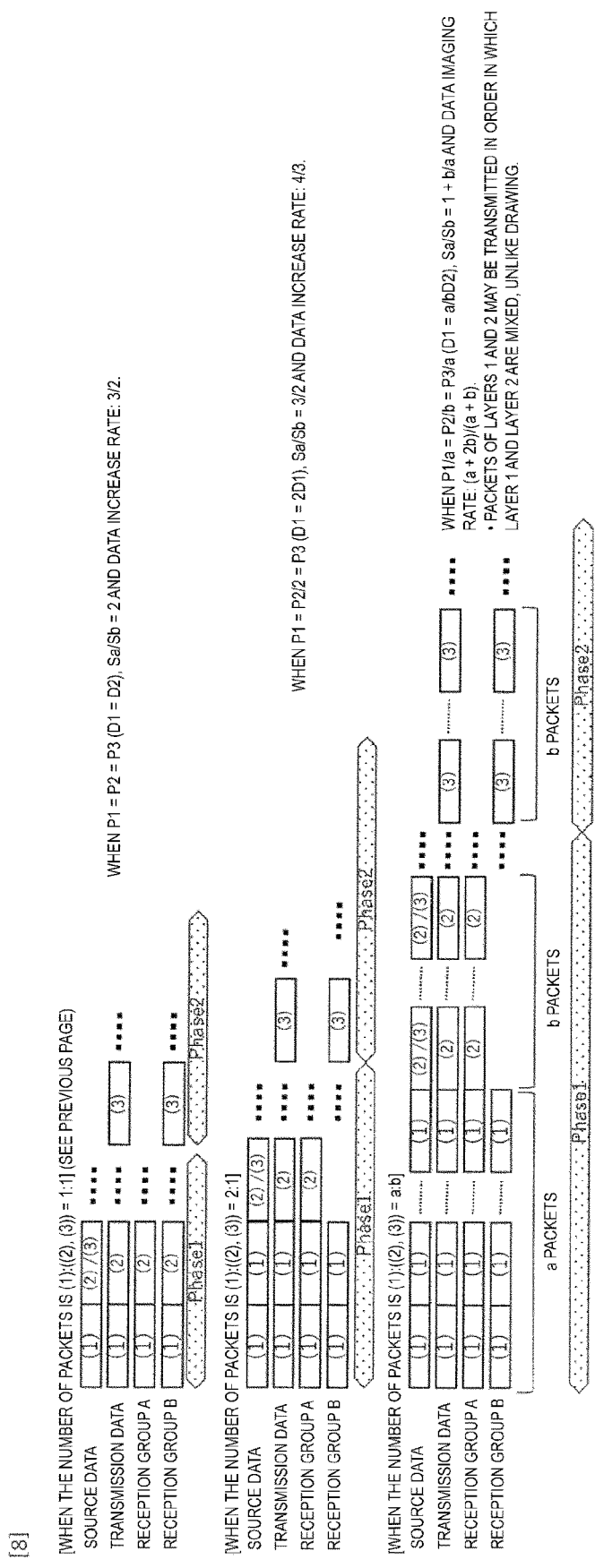
FIG. 8 is an example of a layer pattern in which the number of receiving groups is two.

An example of a layer pattern in a case in which the number of reception groups is two is illustrated in FIG. 8.

Figure 9:
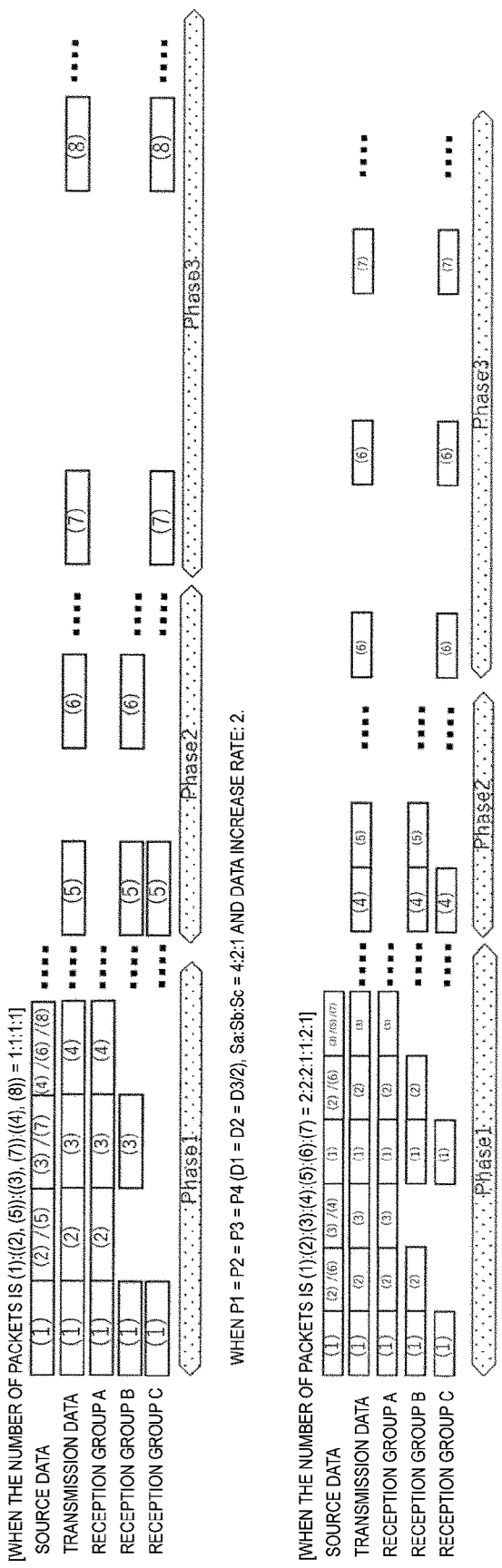
FIG. 9 is an example of a layer pattern in which the number of receiving groups is three.

An example of a layer pattern in a case in which the number of reception groups is three is illustrated in FIG. 9.

Apparatus Configuration

Figure 10:
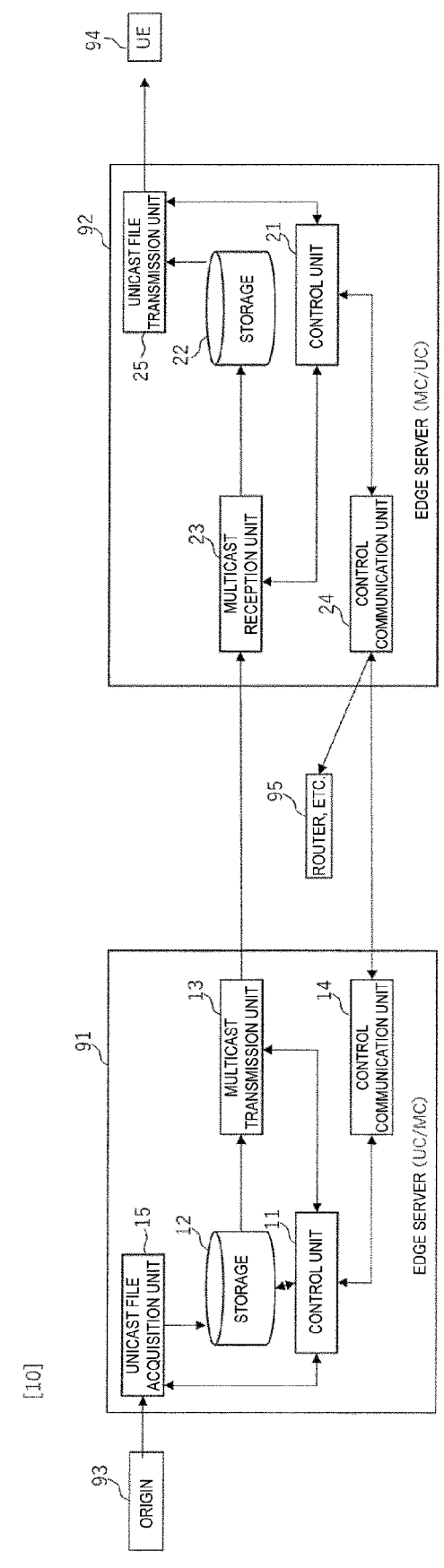
FIG. 10 is an example of a configuration of an edge server (UC/MC) and an edge server (MC/UC).

An exemplary configuration of the edge server (UC/MC) 91 and the edge server (MC/UC) 92 for forming the above-described systems is illustrated in FIG. 10. However, other configurations may be used to form the system described above.

The edge server (UC/MC) 91 includes a unicast file acquisition unit 15, a storage 12, a multicast transmission unit 14, a control unit 11, and a control communication unit 14. The edge server (UC/MC) 91 can be realized by a computer and a program, and the program can be recorded on a recording medium or provided through a network.

The unicast file acquisition unit 15 can acquire files from the origin 93 in unicast communications and store it in the storage 12. In addition, the unicast file acquisition unit 15 can request a file from the origin 93 in accordance with an instruction from the control unit 11. The storage 12 is a computer resource that can store data, such as a HDD, an SSD, a memory, or the like.

The multicast transmission unit 14 can read files from the storage 12 and transmit the files as multicast packet according to an instruction from the control unit 11. In addition, the multicast transmission unit 14 can transmit data of one file as a plurality of streams or layers with different transmission rates according to an instruction from the control unit 11. Furthermore, FEC information can be added to the transmission data.

The control communication unit 14 can receive (1) multicast stream information request from the edge server (MC/UC) 92 and transfer the information to the control unit 11. In addition, the control communication unit 14 can transmit (2) multicast stream information response to the edge server (MC/UC) 92 according to an instruction from the control unit 11. Furthermore, the control communication unit 14 can receive (4) multicast stream request from the edge server (MC/UC) 92 and transfer the information to the control unit 11. In addition, the control communication unit 14 can receive (6) notification of stop/completion of reception of multicast stream from the edge server (MC/UC) 92 and transfer the information to the control unit 11. The control unit 11 can perform the above-described control over the multicast transmission unit 13 and the control communication unit 14. In addition, in a case in which the requested file does not stored in the storage, the control unit 11 can instruct the unicast file acquisition unit 15 to request the file from the origin.

The edge server (MC/UC) 92 includes a unicast file transmission unit 26, a storage 222, a multicast reception unit 23, a control unit 21, and a control communication unit 24. The edge server (MC/UC) 92 can be realized by a computer and a program, and the program can be recorded on a recording medium or provided through a network.

Receiving a request for a file from the UE 94, the unicast file transmission unit 92 can transmit the file in the storage 22 to the UE 94 in unicast communication. Furthermore, when the file is not stored in the storage 22, the unicast file transmission unit 92 can notify the control unit 21 that the file is not stored in the storage 22. In addition, the unicast file transmission unit 92 can monitor the storage 22 or know generation of a file to be transmitted to the UE 94 from the notification from the control unit 21, and then read the file from the storage 22 to transmit the file to the UE 94 in unicast communication.

The storage 22 is a computer resource that can store data, such as a HDD, an SSD, a memory, or the like.

The multicast reception unit 23 can receive files from the multicast transmission unit 13 and write the files into the storage 22. In addition, information related to reception states, such as packet loss information can be notified to the control unit. Further, the information can be notified to the control unit 21 based on a request from the control unit 11. In addition, received data may be subject to error correction and detection using FEC information.

The control communication unit 24 can transmit (1) multicast stream information request to the edge server (UC/MC) 91 according to an instruction from the control unit 21. In addition, the edge server can receive (2) multicast stream information response from the edge server (UC/MC) 91 and transfer the information to the control unit 24. Furthermore, a packet for (3) Join processing can be transmitted to a nearby router 95 with packet reachability, or the like based on an instruction from the control unit 21. In addition, (6) notification of stop/completion of reception of multicast stream can be transmitted to the edge server (UC/MC) 91 based on an instruction from the control unit 24. Furthermore, a packet for (7) Leave processing can be transmitted to the nearby router 95 with packet reachability, or the like based on an instruction from the control unit 24.

The control unit 21 can perform the above-described control over the multicast reception unit 23 and the control communication unit 24. Furthermore, the control unit 21 can instruct the control communication unit 24 for (1) multicast stream information request based on a request from the unicast file transmission unit 25.

Effects Obtained from the Present Disclosure

Content can be distributed with a low latency in the multicast communication to the edge servers (MC/UC) 92 connected to a network with high rate and stability and the edge servers (MC/UC) 92 with a high multicast reception capacity, without being restricted by other low-rate and unstable networks, or the edge servers (MC/UC) 92 with a low capacity. In addition, stable content can be distributed to low-rate and unstable networks and edge servers (MC/UC) 92 with a low capacity.

Furthermore, as a result, a network for homogeneous multicast transmission may not be needed, management of QoS may not be needed, or an unstable wireless multicast network may be used. Similarly, an edge server (MC/UC) 92 with a low capacity that does not need management may be used.

In particular, content with the same image quality can be distributed while controlling the quality of latency in accordance with a state of a network or a terminal.

In the expansion method, by sharing part of data with reception groups having different rates as layers, the above-described effects can be exhibited with a smaller amount of data transmission than the number of reception groups. In addition, this method is not based on the premise of hierarchy/scalability by codecs and is not dependent on details of the content (files), but can achieve scalability of a transfer rate.

Points of the Present Disclosure

When the number of viewers is large, live HTTP streaming tends to generate a load with a peak on a distribution server or network, and thus QoE in viewing the video is easily deteriorated. On the contrary, while a multicast conversion technique for some relevant sections brings the effect of reducing the amount of traffic, if there is some equipment that needs to delay reception in the multicast communication, the overall transfer latency increases. As a result, in order to reduce such a transfer latency, equipment with a high rate, stability, and high performance in multicast reception has been required on an available network.

The present disclosure enables a plurality of multicast streams of one piece of content having different transfer rates to be generated using the multicast conversion technique for some relevant sections and thus enables various networks and low-performance multicast reception equipment that have low rate and are not manageable or for wireless communication to be used while maintaining sufficient traffic reduction effects.

In particular, the method in which content with the same image quality can be controlled for the quality of latency and distributed in accordance with a state of a network or a terminal has never been before.

INDUSTRIAL APPLICABILITY

The present disclosure can be applied in the information and telecommunication industry.

REFERENCE SIGNS LIST

91 Edge server (UC/MC)
11 Control unit
12 Storage
13 Mar control communication unit
14 Ticast transmission unit
15 Unicast file acquisition unit
21 Control unit
22 Storage
23 Multicast reception unit
24 Control communication unit
25 Unicast file transmission unit
92 Edge server (MC/UC)
93 Origin
94 UE
95 Router

The invention claimed is:

1. A content distribution system for converting part of communication for distribution into a multicast communication, the content distribution system comprising:
a transmission-side edge server configured to convert an incoming unicast communication into the multicast communication and perform transmission to a multicast communication network; and
a reception-side edge server configured to convert the multicast communication transmitted on the multicast communication network into an outgoing unicast communication,
wherein the transmission-side edge server divides content from the incoming unicast communication into three layers of data such that data of layer one differs from data of layer two and the data of layer two is same as data of layer three;
wherein the transmission-side edge server alternatively transmits data packets from layer one and data packets from layer two at a first transfer rate during a first phase of the multicast communication, and transmits data packets from layer three at a transfer rate half of the first transfer rate during a second phase of the multicast communication after completion of the first phase.

2. The content distribution system of claim 1 wherein the reception-side edge server is configured to process the multicast communication at the first transfer rate and reconstruct the content from the data packets received during the first phase.

3. The content distribution system of claim 2 further comprises another reception-side edge server configured to process the multicast communication at the second transfer rate and reconstruct the content from the data packets from layer one and the data packets from layer three.

4. A content distribution method performed by a content distribution system for converting part of communication for distribution into a multicast communication,
the content distribution system comprising a transmission-side edge server configured to convert an incoming unicast communication into the multicast communication and perform transmission to a multicast communication network, and a reception-side edge server configured to convert the multicast communication transmitted on the multicast communication network into an outgoing unicast communication, the method comprising:

dividing, by the transmission-side edge server, content from the incoming unicast communication into three layer such that data of layer one differs from data of layer two and the data of layer two is same as data of layer three;

alternatively transmitting, by the transmission-side edge server, data packets from layer one and data packets from layer two at a first transfer rate during a first phase of the multicast communication; and after completion of the first phase, transmitting, by the transmission-side edge server, data packets from layer three at a transfer rate half of the first transfer rate during a second phase of the multicast communication.

5. The content distribution method of claim 4 further comprising processing, the reception-side edge server, the multicast communication at the first transfer rate and reconstructing the content from the data packets received during the first phase.

6. The content distribution method of claim 5 further comprising processing, by another reception-side edge server, the multicast communication at the second transfer rate and reconstructing the content from the data packets from layer one and the data packets from layer three.

* * * * *